United States Patent
Knestel et al.

(10) Patent No.: US 11,221,277 B2
(45) Date of Patent: Jan. 11, 2022

(54) DEVICE FOR SIMULATING THE VIBRATIONAL BEHAVIOR OF VEHICLES

(71) Applicant: AIP GmbH & Co. KG, Haldenwang (DE)

(72) Inventors: Anton Knestel, Hopferbach (DE); Jürgen Küchle, Hopferbach (DE); Thomas Becherer, Dietmannsried (DE)

(73) Assignee: AIP GmbH & Co. KG, Haldenwang (DE)

( * ) Notice: Subject to any disclaimer, the term of this patent is extended or adjusted under 35 U.S.C. 154(b) by 161 days.

(21) Appl. No.: 16/472,159

(22) PCT Filed: Dec. 19, 2017

(86) PCT No.: PCT/EP2017/083505
§ 371 (c)(1),
(2) Date: Jun. 20, 2019

(87) PCT Pub. No.: WO2018/114926
PCT Pub. Date: Jun. 28, 2018

(65) Prior Publication Data
US 2019/0331556 A1    Oct. 31, 2019

(30) Foreign Application Priority Data
Dec. 21, 2016  (DE) .......................... 102016225924.5

(51) Int. Cl.
*G01M 17/00*  (2006.01)
*G01M 17/007*  (2006.01)
(Continued)

(52) U.S. Cl.
CPC ........ *G01M 17/0074* (2013.01); *G01M 7/022* (2013.01); *G01M 17/045* (2013.01)

(58) Field of Classification Search
CPC . G01M 7/022; G01M 17/0074; G01M 17/045
(Continued)

(56) References Cited

U.S. PATENT DOCUMENTS 3,520,180 A * 7/1970 Ris ...................... G01M 17/045
73/670
4,981,034 A * 1/1991 Haeg ................... G01M 13/027
73/115.07
(Continued)

FOREIGN PATENT DOCUMENTS

CN    201053921 Y    4/2008
CN    101248344 A    8/2008
(Continued)

OTHER PUBLICATIONS

International Search Report of application No. PCT/EP2017/083505; completion date: Jul. 19, 2018; 10 pp. (English translation attached).
(Continued)

*Primary Examiner* — Eric S. McCall
(74) *Attorney, Agent, or Firm* — Womble Bond Dickinson (US) LLP

(57) ABSTRACT

The disclosed embodiments relate to a test stand for the simulation of the vibration behavior of a vehicle. The test stand comprises a receiving element for contacting with a vehicle and an excitation system for the application of excitation frequencies. The excitation system comprises a main actuator system with at least one movable main actuator and an additional actuator system with at least one movable additional actuator, the additional actuator system being connected to the main actuator system.

23 Claims, 6 Drawing Sheets

(51) Int. Cl.
   *G01M 7/02* (2006.01)
   *G01M 17/04* (2006.01)
(58) Field of Classification Search
   USPC .................................................. 73/669, 670
   See application file for complete search history.

(56) References Cited

U.S. PATENT DOCUMENTS

| | | | | |
|---|---|---|---|---|
| 5,533,403 A * | 7/1996 | Haeg | ................... | G01M 13/027 73/669 |
| 5,610,330 A | 3/1997 | Fricke et al. | | |
| 6,257,055 B1 * | 7/2001 | Haeg | ................... | G01M 13/027 73/116.01 |
| 6,640,638 B1 * | 11/2003 | Haeg | ................... | G01M 17/007 73/116.01 |
| 8,966,987 B2 * | 3/2015 | Clusserath | ........ | G01M 17/0074 73/669 |
| 2008/0078250 A1 * | 4/2008 | Nelsen | ................ | G01M 17/007 73/666 |
| 2008/0229836 A1 * | 9/2008 | Melz | ................... | G01M 17/007 73/669 |
| 2018/0038766 A1 * | 2/2018 | Knestel | ................ | G01M 9/062 |

FOREIGN PATENT DOCUMENTS

| | | |
|---|---|---|
| CN | 103189728 A | 7/2013 |
| DE | 3040355 A1 | 5/1982 |
| DE | 3830049 C1 | 11/1989 |
| DE | 10212255 A1 | 10/2003 |
| DE | 102005031446 A1 | 1/2007 |
| DE | 102010034850 A1 | 11/2011 |

OTHER PUBLICATIONS

Written Opinion of the International Searching Authority of application No. PCT/EP2017/083505; dated Sep. 4, 2018; 25 pp. (English translation attached).

International Preliminary Report on Patentability of application No. PCT/EP2017/083505; dated Jun. 25, 2019; 27 pp. (English translation attached).

Office Action received for Chinese Patent Application No. 201780083476.8, dated Dec. 3, 2020, 15 pages (7 pages of English Translation and 8 pages of Office Action).

* cited by examiner

DEVICE FOR SIMULATING THE VIBRATIONAL BEHAVIOR OF VEHICLES

CROSS-REFERENCE TO RELATED APPLICATIONS

This application is the U.S. National Stage entry under 35 U.S.C. § 371 of international application PCT/EP2017/083505, filed 19 Dec. 2017, which in turn claims priority to German patent application DE 10 2016 225 924.5, filed 21 Dec. 2016.

Field of the Invention

The present invention relates to a device for the testing of vehicles and especially for the simulation of the vibrational behavior of vehicles. Actuators are used to place a vibrational excitation on the vehicle, for example in order to simulate a road travel.

BACKGROUND

Hydraulic test stands are known from the prior art, which use servo-hydraulic rains for the excitation of the vehicle. For example, a tire-coupled road simulator is described in WO 9 806 590 A2, comprising a "four-poster" system. With this system, it is possible to test a fully assembled vehicle. The tire-coupled road simulator has several actuators which support the vehicle.

A vehicle test stand is also discussed in EP 0 577 855 A1, wherein the wheel contact surfaces are moved via a single actuator.

A driving simulator is described in WO 2016 053205 A1, which is designed for the simulation of a road surface as well as for the simulation of an inclination of the vehicle. A fastening system is provided here for the driving simulation, with a base on which a bottom support plate is secured. The system is driven across a shaft. An eccentric is arranged on the shaft, which is connected to an arm. The arm is connected to a carrier plate and in addition a pneumatic spring is provided is provided in order to generate an excitation.

SUMMARY

Starting from the above mentioned prior art, one object of the present invention is to provide a device for the testing of vehicles by which an improved excitation of the vehicle being tested is made possible. Furthermore, one object is to provide a vehicle test stand with which an optimized excitation of the vehicle being tested can be accomplished.

For the solution of the aforementioned objects, a device for the testing of vehicles is proposed according to the independent claims. Dependent claims relate to preferred exemplary embodiments of the invention.

According to one aspect of the invention, a device is proposed for the testing of vehicles, which may have a receiving element having a contact area for contacting with a vehicle. The device may furthermore have an excitation system for the application of excitation frequencies, which stands in connection with the receiving element. The excitation system may comprise a main actuator system with at least one movable main actuator and an additional actuator system with at least one movable additional actuator. The additional actuator system can be connected to at least one movable main actuator. In particular, the additional actuator system can be connected to the main actuator system. Thanks to this characteristic arrangement, it is possible to accomplish an improved excitation frequency range for the excitation of the vehicle.

Servo-hydraulic rains have specific eigenfrequencies according to the mass coupled to them. The elasticities and thus the spring hardness is determined by the strength of the cylinder tube, for example, but also that of the piston and the piston rod, since these are also deformed by appropriately high pressure. Oil is generally considered to be incompressible, as opposed to air, but a certain compressibility is present at appropriately high pressure. Thus, hydraulic oil has a modulus of compression of around $10^9$ to $10^{10}$ Pa. The longer the travel paths of the servo cylinder, the more oil there is in the cylinder and the softer the system becomes. Depending on the coupled mass, the angular frequency results from the spring hardness and the mass of all moving parts, including the moving oil volumes. In large vehicle test stands with correspondingly large moving masses, resonance frequencies of around 50 Hz are produced. However, these frequencies are too low for comfort testing. Thus, in order to improve the frequency range, it is proposed to provide an additional actuator system and to connect this additional actuator system to the main actuator system. In particular, it is proposed to provide the additional actuator system on the main actuator system, and especially at the movable end of the main actuator of the main actuator system. In this way, it is possible to simulate a frequency range from a few Hertz up to a few hundred Hertz. Preferably, frequencies are separated by crossovers similar to that in a loudspeaker system and taken to a regulating system.

The additional actuator system may be provided in the area of a movable end of the main actuator of the main actuator system. Thanks to this advantageous arrangement, an improved excitation of the vehicle can be achieved. In particular, the excitation frequency range can be increased.

The additional actuator system may comprise three and preferably four actuators. The actuators may be oriented parallel to each other, so that they have the same direction of movement. Furthermore, the actuators may be hydraulic and/or electrical actuators. By providing multiple actuators for the additional actuator system, which are oriented in particular parallel to each other, it is possible to reach a very high frequency range, since the individual actuators may be very small in configuration, yet in total they can produce large forces of excitation. Furthermore, the frequency range of the overall excitation system can be increased in this way.

The additional actuator system may comprise at least one spring element, which is contacted with the receiving element. Thanks to such a spring element, on the one hand the frequency range can be optimized and on the other hand the strain on the additional actuators or actuator of the additional actuator system can be reduced, since the spring element supports the additional actuator.

The additional actuator system may comprise four actuators, which are arranged in a square relative to each other, such that each actuator is situated at a corner of the square. This advantageous arrangement of the actuators of the additional actuator system allows the most uniform possible application of the excitation, wherein furthermore a very high frequency range of up to 600 Hz can be simulated.

The actuators of the additional actuator system may be used in a flat track, so that the excitation frequency can be increased. Thus, not only is the main actuator system provided in the flat track, but so too is an additional actuator system with additional actuators, which can simulate very high frequencies.

The device for the testing of vehicles may be designed preferably as a flat track test stand. This has the benefit that a vehicle only needs to be moved onto the test stand, such that the receiving elements enter into contact with the tires of the vehicle. Thus, testing of the vehicle over the advantageous frequency range is easily possible. The excitation system for the flat track test stand can be installed in a test stand chamber, so that the vehicle only needs to drive into the test stand chamber to be positioned directly at the excitation system.

The main actuator system may comprise at least one dual-action cylinder. This has the advantage that the relatively large hydraulic cylinder of the main actuator system can be actuated appropriately in two directions, so that the vehicle can be advantageously excited. Dual-action cylinders furthermore have the advantage of the most uniform and rapid excitation possible, so that the excitation of the vehicle can be improved. In addition, the additional actuator system may also comprise at least one dual-action cylinder. This has the benefit that, in addition to the dual-action cylinder of the main actuator system, a dual-action cylinder is also provided for the additional actuator system, so that a rapid and powerful excitation of the vehicle is possible over the entire excitation frequency range.

The main actuator system may comprise a dual-action hydraulic cylinder and the additional actuator system may comprise at least one single-action hydraulic cylinder (plunger cylinder). In this way, an advantageous device for the testing of vehicles can be provided, since a simplified construction is provided and furthermore the excitation frequency range is broadened. In addition, a spring element can be provided in the additional actuator system to retract the single-action hydraulic cylinder or to retract the piston of the single-action cylinder.

The main actuator system may comprise at least one plunger cylinder and/or the additional system may also comprise a plunger cylinder. Thanks to the provision of ensured a plunger cylinder, the excitation system can be easily provided, so that a simplified construction is ensured and at the same time the high frequency range according to the invention is ensured.

With the main actuator system, excitation frequencies up to a first limit frequency (which is preferably less than or equal to the resonance frequency of the main actuator system) can be applied and excitation frequencies which are greater than the first frequency can be applied via the additional actuator system. Thus, a slower, large main actuator system is provided for the low excitation frequencies and a small, fast additional actuator system is provided with which excitation frequencies larger than the first limit frequency can be applied. Thanks to this two-part design, it is possible to cover a very broad frequency range and thus ensure an optimal excitation.

In other words, the main actuator system may be configured to excite the vehicle up to a first frequency and the additional actuator system to excite the vehicle beyond the first frequency.

The additional actuator system may be situated (spatially) between the receiving element and the main actuator system. This arrangement ensures that, for the excitation in the low frequency ranges, the main actuator system introduces the excitation into the receiving element or into the vehicle which is received on the receiving element via the stationary (not directly actuated) additional actuator system. For high frequencies, the additional actuator system can apply the high excitation frequencies to the vehicle directly via the receiving element. Furthermore, it is advantageous that the additional system can be arranged between the receiving element and the main actuator.

The mass of the additional actuator system may be less than the mass of the main actuator system. Since, in particular, the eigenfrequency of the actuator systems is critically dependent on the moving masses, it is possible to cover a broad frequency range for the excitation of the vehicle by the choice of a small additional actuator system with low mass and a main actuator system with greater mass. In other words, the main actuator system may have a moving mass which is greater than the moving mass of the additional actuator system. Especially advantageously, the main actuator system may contain the moving mass of the additional actuator system. In particular, the moving mass of the main actuator system may contain the moving mass of the additional actuator system. This characteristic design results in a fast and easily built device which can cover the characteristically broad frequency range for the application of the excitations to the vehicle.

Advantageously, the eigenfrequency of the main actuator system may be less than the eigenfrequency of the additional actuator system. Further advantageously, the eigenfrequency of the main actuator system is at most one third of the eigenfrequency of the additional actuator system. It is thus possible to cover a very broad frequency range for the excitation of the vehicle by the appropriate choice of the main and additional systems.

The additional actuator system can be entrained by the movement of the main actuator. This is possible if the additional actuator system is arranged on the movable end of the main actuator, so that an entrainment is possible. During the transition of the excitation frequency from the main actuator system to the additional actuator system it is thus possible to facilitate a smooth transition upon reaching the first limit frequency. In particular, upon reaching the first limit frequency, the main actuator system is replaced by the additional actuator system for the excitation of the vehicle, wherein the series connection of the actuator systems enables a direct application of the excitation frequencies of the additional actuator system upon reaching the first limit frequency.

The device may comprise four (separate) receiving elements and a dedicated excitation system can be associated with each receiving element. Thanks to this design, a device is provided which forms a so-called four-poster system, so that vehicles and especially motor vehicles can be contacted at four tires across the receiving elements and can be excited via the separate excitation systems.

The excitation system can generate an excitation in the vertical direction. This excitation may occur in particular from both the main actuator system and the additional actuator system in the vertical direction, wherein the vertical direction preferably extends along the height axis of the vehicle.

The additional actuator may be arranged at one end of the main actuator. In particular, a main receiving plate can be provided at the movable end of the main actuator and the additional actuator can be arranged on the main receiving plate. Thanks to this advantageous arrangement, a simple device can be provided which can cover the characteristic frequency range.

The additional actuator can be mechanically coupled (directly) to the main actuator. Thanks to this mechanical coupling, it is possible to move the additional actuator or to move the entire additional actuator system when the main actuator is actuated. Thanks to this characteristic arrangement, it is possible to superimpose different frequencies or to uniformly apply different frequencies. These may also be greater than the first limit frequency.

The additional actuator may be arranged at one end of the main actuator such that the additional actuator is also entrained at the same time with the movement of the main actuator. Preferably, the additional actuator is moved in the same direction as the main actuator. This preferred direction is vertical to the vehicle.

The main actuator system and the additional actuator system may be hydraulic systems and both systems may be connected across a common hydraulic feed system. The additional actuator system may also be electromechanically activated.

The main actuator system may have, as its main actuator, a first hydraulic cylinder with a movable end section, and the additional actuator system may have, as its additional actuator, at least one second hydraulic cylinder, wherein at least one second hydraulic cylinder can be fastened on the movable end section of the first hydraulic cylinder. Thanks to this advantageous arrangement of the additional actuator system relative to the main actuator system, the advantageous frequency range for the excitation of the vehicle can be achieved in a simple manner.

The receiving element may comprise two rollers, which are rotatably joined together by a belt to form a flat belt support. It is especially advantageous to provide a flat belt support of one receiving element so that, in addition to the excitation preferably in the vertical direction of the vehicle, a rotary movement can also be simulated by the turning of the rollers and the belt. In this way, the vehicle can be positioned on the device in such a way that the vertical excitation can be transmitted across the vehicle wheels to the vehicle and in addition the wheels can also turn or they can be excited in the horizontal direction. Thus, thanks to this multiaxial excitation, the vehicle can be excited in multiple axes at the same time, so that on the one hand the improved frequency range can be provided and on the other hand many other driving situations can be simulated. In this way, the frequency investigation of the vehicle can be improved significantly.

The additional actuator may stand in connection with the belt in such a way that the latter can be excited by the additional actuator system and wherein the main actuator can stand in connection with at least one roller of the flat belt support in such a way that the roller can be excited via the main actuator system. The excitation in the high frequency ranges occurs via the additional actuator, and thus advantageously directly on top of the belt on which the vehicle tires are arranged. The excitation in the lower frequencies occurs via the main actuator system, namely via the main actuator, which stands in (direct) connection with the rollers of the flat belt support, so that the low frequencies can be readily applied to the vehicle. Thanks to this especially advantageous arrangement, it is possible to further reduce the moving mass of the additional actuator system, since this only needs to actuate the belt on which the vehicle tires are located, and therefore the excitation frequencies can be further increased.

Advantageously, a belt support can be provided for the contacting with the belt and the additional actuator system may stand in connection with the belt support. Thus, thanks to this belt support, it is possible to introduce the excitation into the belt across the additional system and thereby keep the moving mass of the additional actuator system as low as possible. The frequency range can be further increased. The belt support has the advantage that the excitation is introduced into the belt not at one point, but over an area, so that the durability of the belt can be further enhanced and the excitation frequencies can be optimized.

The belt support may thus comprise a flat section, which can be contacted with the belt. The belt support can furthermore be mounted across a fluid bearing in order to prevent contact of the belt with the belt support even under load. Thus, an optimal frequency range can be achieved by the excitation system.

The additional actuator may preferably stand directly in connection with the belt support. Furthermore, the additional actuator system and the belt support may preferably be provided at least partly between the rollers of the flat belt support. Thanks to this configuration, it is possible to arrange the additional actuator system advantageously for the excitation in the higher frequency range, so that the most harmonic transition possible can be ensured for the transition from the excitation via the main actuator system to the excitation via the additional actuator system. The frequency range of the device can therefore be optimally utilized. The excitation (of the vehicle) via the main actuator system can occur preferably via the main actuator and the rollers of the flat belt support in connection with it, wherein between these rollers is arranged the additional actuator system, which excites the belt support and the belt of the flat belt support.

Preferably, the vehicle wheels can be excited in the horizontal direction via the belt (by the turning of the rollers). In other words, an excitation can be applied to the vehicle wheels across the belt, being transverse (preferably orthogonal) to the direction of excitation of the main actuator system and of the additional actuator system. Preferably, the main actuator system is designed to apply an excitation in the vertical direction.

The main actuator system may be used substantially up to an excitation frequency of 50 Hz and the additional actuator system for frequencies over 50 Hz. Especially preferably, the additional actuator system is used up to a frequency of 600 Hz. The achievement of these excitation frequencies enables an especially advantageous design of the device, since the main actuator system may be used up to the frequency of (substantially 50) Hz, so that it may have correspondingly large masses (moving masses or coupled masses) and wherein the additional actuator system can be used for frequencies above this 50 Hz, so that the broadest possible frequency range can be achieved. It is possible to reach a frequency of up to 600 Hz by the appropriate choice of the actuators of the additional actuator system.

The receiving element may also be a wheel pan for the receiving of a wheel of the vehicle being tested. Thus, if a test stand is needed in which only a vertical excitation is adequate, an efficient application of the excitation frequencies by a wheel pan as the receiving element is possible.

A vehicle test stand can be provided which comprises a device according to the aforementioned features, wherein the vehicle test stand is preferably a flat belt test stand.

The vehicle test stand may preferably comprise four main actuator systems and four additional actuator systems, wherein each main actuator system comprises a hydraulic rain on which an additional actuator system is provided and preferably secured to it.

Each additional actuator system may preferably comprise four auxiliary hydraulic rams. The main actuator systems and the additional actuator systems may be designed to excite a vehicle positioned on the test stand in the vertical direction with at least one excitation frequency via the vehicle tires which can be received on the receiving elements. Thanks to this advantageous vehicle test stand, it is possible to excite the vehicle in a simple and efficient manner and furthermore to ensure the excitation in the broadest possible frequency range.

Preferably the moving mass of the additional actuator system is <20 kg and the moving mass of the main actuator system is <400 kg in the event that no vehicle has been placed on the device and thus in the event that the device is unloaded. Thanks to this configuration, it is possible to ensure the operation in the advantageous frequency range.

In one advantageous modification, the rollers are designed as carbon rollers, so that the moving mass can be further reduced for the main actuator system, so that the eigenfrequency of the main actuator system can be further increased and the excitation characteristic of the vehicle test stand can be improved. The main actuator system can be actuated at least by one servo valve and wherein the servo valve is arranged at the stationary part of the main actuator system. Thanks to this advantageous arrangement it is possible to further reduce the moving mass of the main actuator system.

The additional actuator system can be actuated via an auxiliary control servo valve and the auxiliary control valve can be arranged on the movable part of the main actuator system. Thanks to this configuration, a compact additional actuator system is provided, for which a high-frequency excitation of the vehicle is possible.

The main actuator system may comprise a hydraulic actuator and the oil for the movement of the hydraulic actuator may be supplied by a pulsating pressure via an oil feed line.

A reset spring may be provided for the resetting of the plunger cylinder.

At one movable end of the main actuator there may be provided a main receiving plate and on the main receiving plate there may be arranged the additional actuator system. In particular, the additional actuator system may advantageously comprise three additional actuators, so that an efficient excitation of the vehicle becomes possible.

Advantageous embodiments and further details of the present invention will be described in the following with the aid of various exemplary embodiments with reference in to schematic figures. The invention is explained more detail in the schematic figures.

DETAILED DESCRIPTION

In the following, various examples of the present invention will be described in detail with reference to the figures. The same or similar elements are designated by the same reference numbers. However, the present invention is not limited to the described features, but instead furthermore encompasses modifications of features of different examples within the scope of the independent claims.

Figure 1:
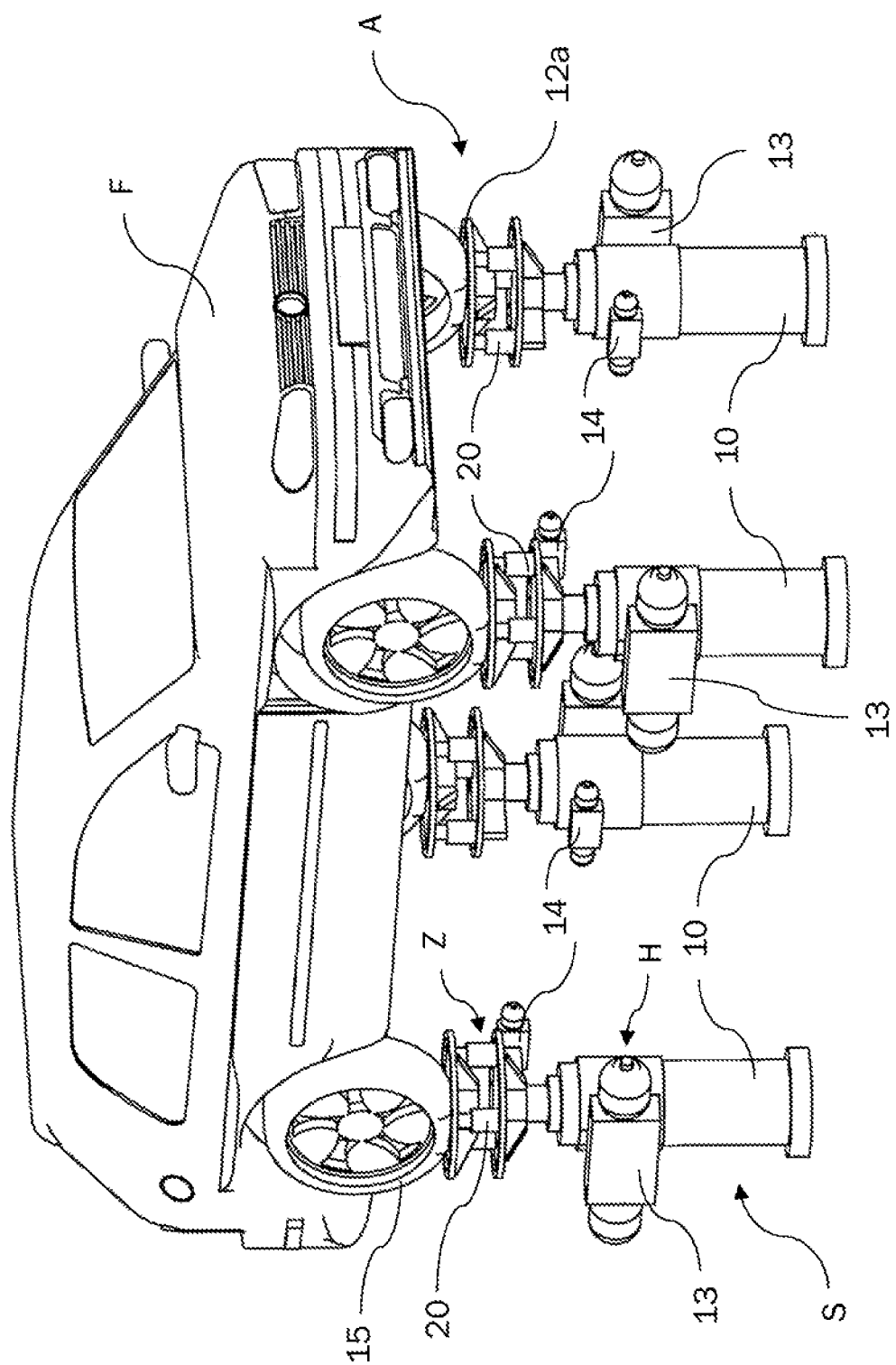
FIG. 1: shows a first view of a vehicle test stand with excitation systems for the excitation of a vehicle.

FIG. 1 shows a vehicle F which is provided on a vehicle test stand according to the invention. This vehicle test stand comprises the excitation system S for the application of excitation frequencies to the vehicle F being tested as well as receiving elements A arranged between the vehicle F and the excitation system S.

In the embodiment as represented in FIG. 1, the vehicle F is received by the vehicle tires 15 on four receiving elements A, each receiving element A being associated with its own excitation system S. Each of these excitation systems S is in turn divided into a main actuator system H and an additional actuator system Z. The main actuator system H is designed to apply frequencies in the lower frequency range up to a limit frequency. Beyond this limit frequency, the excitation is performed by the additional actuator system Z. The limit frequency is determined in particular by the eigenfrequency of the main actuator system H. The main actuator system H can only reach frequencies up to this eigenfrequency (limit frequency). If excitation frequencies beyond this limit frequency are required, the additional actuator system Z will be used to excite the vehicle F accordingly.

For the simulation of a road travel, such as bumpy roads for example, an appropriate vibrational excitation of the vehicle or of parts of the vehicle is possible via hydraulic cylinders. The excitation conditions may be varied, so that tests can be performed at different excitation frequencies and amplitudes.

In the case of vehicle test stands (and especially vehicle test stands using pulsating flat belts), the mass of the wheel belt unit (receiving element A) needs to be taken into account. Due to this additional mass of the receiving element A with which the wheel belt unit is associated, the eigenresonance is decreased by this additional mass. Thus, especially in the case of vehicle test stands which use flat belts (depending on the design and the stroke length of the servo cylinder), frequencies of less than 100 Hz can be achieved as the excitation frequency. In a test stand with movably driven belts, due to the even greater moving mass, a resonance frequency of only 50 Hz can be expected. However, these frequencies are too low during comfort tests, and therefore the invention proposes switching two systems in series. The large actuator system (with large coupled mass) is switched in series with a small actuator system (with small coupled mass and small oil volume). Accordingly, a main actuator system H is provided, on which the additional actuator system Z is provided. The main actuator system H has a relatively large coupled mass and the additional actuator system has a small coupled mass, so that higher frequencies can be achieved with the smaller actuator system. The frequencies below the resonance frequency of the main cylinder of the main actuator system H (main actuator 10) are excited by the main cylinder. The larger frequencies are taken over by the additional actuator system Z (second servo system). Thanks to this advantageous configuration, it is possible to simulate a frequency range from a few Hz to 600 Hz (preferably 750 Hz). The frequencies are separated by suitable means similar to that in a loudspeaker system and taken to a regulating system.

In FIG. 1, the vehicle F is standing on a four-poster vehicle test stand, wherein the main actuator system H comprises a main actuator 10, which is a servohydraulic actuator. This main actuator 10 is actuated by a servo valve 13 for the main actuator system H. This servo valve 13 makes it possible to supply the required hydraulic fluid to the main actuator 10, so that the excitation up to the limit frequency of the main actuator 10 can be produced. The excitation by the main actuator 10 occurs here in the vertical direction. The vertical direction per FIG. 1 is thus the direction of the (substantially) vertical axis of the vehicle and thus is orthogonal to the plane on which the excitation systems S are arranged, preferably parallel to each other. The main actuators 10 are preferably actuated by single or multistaged servo valves. The additional actuator system Z per FIG. 1 may also comprise hydraulic additional actuators 20, which are actuated by respective servo valves 14. The servo valves 14 for the additional actuator system are preferably arranged on the movable part or even more preferably on the housing of the main actuator 10 (i.e., on the stationary part of the main actuator 10). In this way, the moving mass of the main actuator 10 can be reduced, so that a better excitation with a higher limit frequency can be reached. Depending on the arrangement of the servo valve 14, the oil supply and drainage must be transmitted to the actuator either with fixed pressure or by a pulsating pressure.

The moving mass of the unloaded excitation system S preferably lies in the range of 250 kg for the main actuator 10, including hydraulic fluid of the main actuator 10. For the additional actuator 20, the moving mass in the unloaded condition lies in the range of 10 kg, including the hydraulic fluid.

As shown in FIG. 1, the main actuator system H comprises the main actuator 10, which is firmly connected at the movable end of the piston of the main actuator 10 to a main receiving plate 12. This main receiving plate 12 serves as a base for the fastening of the additional actuator system Z. The additional actuator system Z comprises the additional actuators 20, which have to move much smaller masses than the main actuator 10, since in particular the hydraulic volumes of the main actuator 10 as compared to an additional actuator 20 are already less in the range of a factor of 10. Furthermore, the additional actuators 20 of the additional actuator system Z are arranged on the main receiving plate 12, so that the masses of the additional actuators 20 and of the main receiving plate 12 also count as moving masses of the main actuator 10.

The receiving plate 12a is provided at the movable ends of the piston of the additional actuators 20, which in the exemplary embodiment shown is designed as a wheel pan. This is not mandatory however, since this receiving plate 12a as part of the receiving element A can also be configured as a flat belt support, as is represented for example in FIG. 2, so that the wheels of the vehicle can also turn or can be excited in the horizontal direction. Preferably, the additional actuators 20 are provided (welded) equidistantly on the main receiving plate 12, so that an optimal excitation of the receiving plate 12a and of the vehicle or vehicle tire located thereon can be made possible. The additional actuator system Z comprises three additional actuators 20 and preferably four additional actuators 20 for the most homogeneous possible application of the required high excitation frequencies. This also has the advantage in particular that by providing three or four additional actuators 20 for the additional actuator system the excitation frequencies can be further increased, so that the excitation frequency range can be made even broader, since the moving masses of the individual additional actuators 20 can be decreased (because the individual additional actuators 20 are kept as small as possible). It is furthermore possible to apply the required excitation force or the necessary excitation distance uniformly and effectively, since the additional actuators 20 are arranged parallel to each other. Thus, the additional actuators 20 act jointly on the receiving plate 12a so as to appropriately excite the vehicle tire or the vehicle received on it.

The servo valve 13 for the main actuator system is preferably arranged on the stationary part of the main actuator 10, so that the moving mass of the main actuator 10 can be reduced. The main receiving plate 12 and the receiving plate 12a are preferably made of fiber-reinforced plastics, so that a further weight reduction of the moving mass of the main actuator 10 can be achieved and the limit frequency can be increased. This results on the one hand in an improvement in the energy balance of the vehicle test stand and on the other hand in an improvement in the permissible frequency range for the excitation of the vehicle.

The test stand for detecting the vibrational behavior of the vehicle may be designed as a road simulator, which can excite the vehicle being tested by hydraulic systems. The test stand may also advantageously be arranged in a test chamber, so that the vehicle can be driven into the test chamber and onto the wheel pans or receiving plates 12a. A special test chamber is used in order to detect and track certain noises and vibrations of a fully assembled vehicle. By exerting forces on the wheels, the wheel pans follow a path similar to a road profile. The simulation of a road along a vehicle can be used to localize the creaking and rattling noises in the vehicle and to measure the abilities of the tire and suspension system to isolate road noises from the vehicle. The test stand may preferably be installed close to the floor in the test chamber so that a vehicle can easily be placed in the test chamber and onto the test stand.

Figure 2:
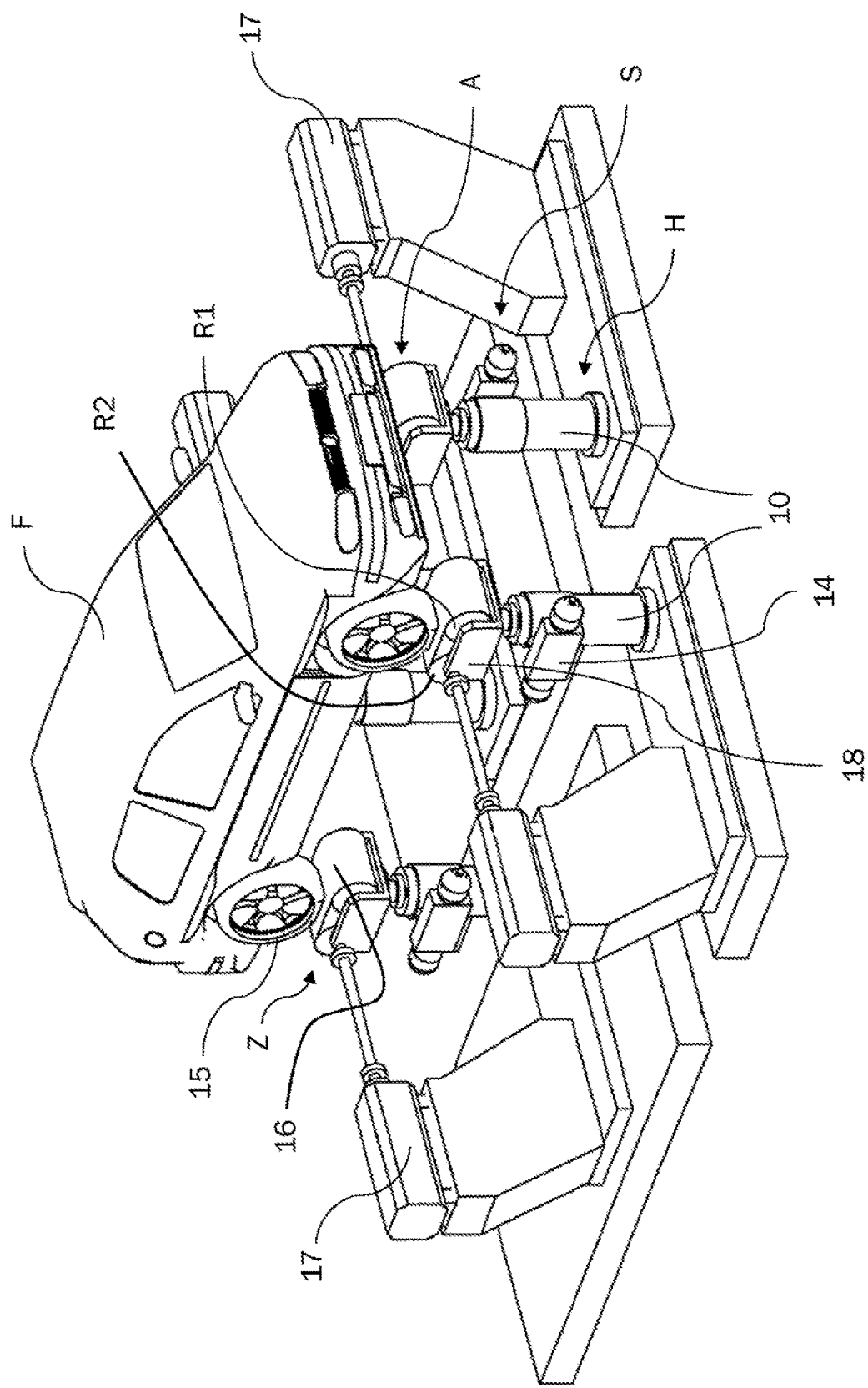
FIG. 2: shows a further embodiment of the vehicle test stand with an excitation system which can excite the vehicle via flat belt supports.

FIG. 2 shows a further embodiment of the present invention. In this embodiment, the receiving elements A each comprise a flat belt support system. This flat belt support system comprises a (preferably metallic belt) 16, on which the vehicle may be placed by the vehicle tires. The rollers R1 and R2 of the flat belt support can be driven by the dynamic drive 17, so that the belt 16 extending across the rollers R1 and R2 is moved. The vehicle wheels 15 can be moved across the belt 16 in the horizontal direction (X direction) and they can be excited or modulated in the X direction by the dynamic drive 17. The wheel belt unit 18 (flat belt support) is respectively excited in the vertical direction by the main actuator 10 of the main actuator system H. It is especially advantageous for the mass of the additional excitation system Z to be much smaller than the mass of the main excitation system H, in order to provide an optimal shaker system. As already discussed, very high frequencies and thus a very large frequency range can be covered in this way. The main actuators 10 have a piston which passes on the movement of the main actuator 10. This piston is joined at one end to a plate, which is joined to the wheel belt unit 18. This wheel belt unit 18 should be assigned to the receiving element A, so that the receiving element A can be excited directly via the main actuator 10 of the main actuator system H. This excitation is passed on to the vehicle F being tested via the rollers R1 and R2 and the belt 16.

In the exemplary embodiment of FIG. 2, the additional actuator system Z is arranged directly beneath the moving belt 16 or positioned in the belt support. The additional actuator system Z comprises at least one additional actuator 20, which only has to move a directly coupled mass of a few kg and thus can act directly on the belt 16. The moving mass of the main actuator system H, on the other hand, may easily comprise several hundred kg. With this characteristic design, it is therefore possible to apply the low frequencies up to a limit frequency with the main actuator system H and beyond this limit frequency the excitation can be performed by the additional actuator system Z. At the same time, the vehicle may also be excited in the horizontal direction by the dynamic drives 17, which controls the rotary movement of the wheels R1 with R2, so that the belt 16 which is in contact with the wheels of the vehicle can be moved. With such a vehicle test stand, it is therefore possible to excite the vehicle in the vertical direction and also additionally in the horizontal direction and in particular to also set the wheels of the vehicle in rotation. As in the case of the first exemplary embodiment, this test stand can also be provided close to the floor in a test stand chamber, so that a simple placement of the vehicle onto the test stand is possible.

Various advantageous schematic configurations of the construction of the excitation system S are shown in FIGS. 3a to 3d.

Figure 3:
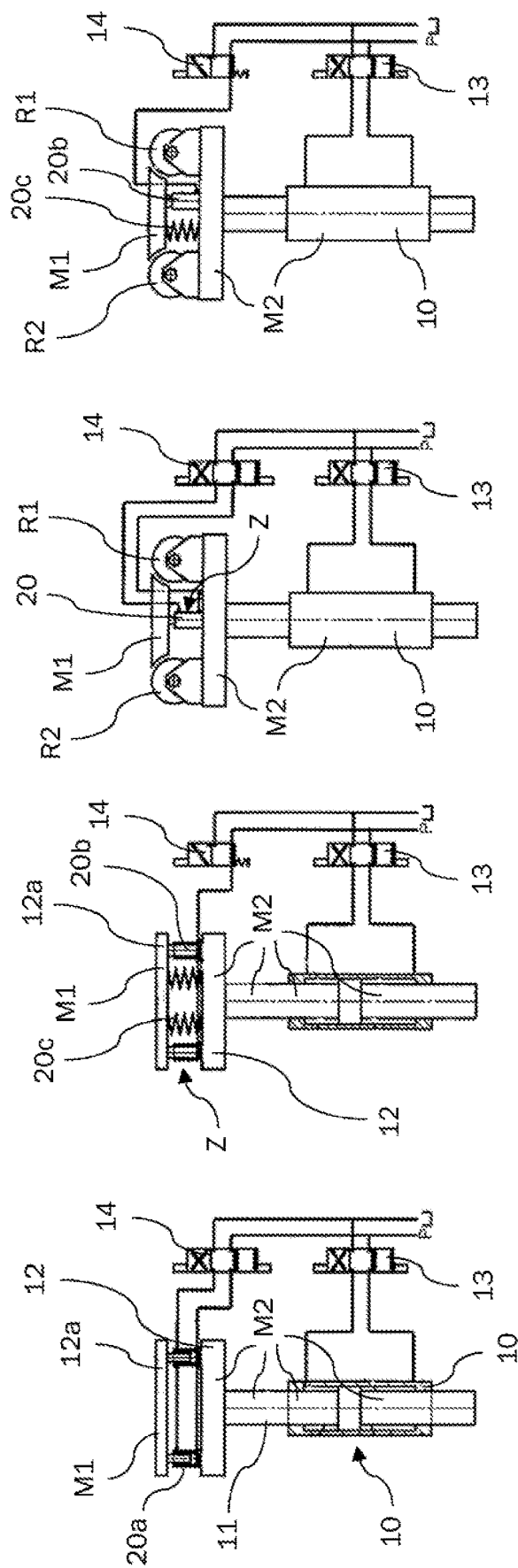
FIG. 3a: shows a sectional representation of a first exemplary embodiment of the present invention.
FIG. 3b: shows a second embodiment of the present invention.
FIG. 3c: shows a sectional representation of a third embodiment of the present invention.
FIG. 3d: shows a fourth embodiment of the present invention.

FIG. 3a shows the main actuator system H, which comprises the main actuator 10. This main actuator 10 is preferably a servohydraulic main actuator. A hydraulic fluid is present in this main actuator 10, which should be counted as part of the moving mass of the main actuator 10 (see m2 in FIG. 3a). In addition, the main actuator 10 comprises a piston 11, which extends toward the main receiver plate 12. Preferably, the piston 11 is firmly connected to the main receiver plate 12 without any insulating layer in between. The elements of the additional actuator system Z are arranged in turn on the main receiver plate 12. In the embodiment shown, dual-acting cylinders 20a are used for the additional actuators 20 of the additional actuator system. By means of these dual-acting cylinders 20a, it is possible to regulate both the vertical movement toward the vehicle and away from the vehicle through the hydraulic pressure. The actuation of the respective actuators is possible through the servo valves 13 and 14.

The main actuator 10 is actuated via the servo valve 13, the main actuator 10 in FIG. 3a also being designed as a dual-acting cylinder. The dual-acting cylinders 20a of the additional actuator system Z are actuated by the servo valve 14. The pistons of the dual-acting cylinders 20a of the additional actuator system Z are connected to a receiver element A. This receiver element A is for example a receiving plate 12a. The moving mass of the additional actuator system Z in the system per FIG. 3a consists of the mass m1 of the receiving plate 12a (wheel contact plate) and that of the hydraulic fluid and of the pistons of the dual-acting cylinders 20a. This overall moving mass may be denoted as M1. The moving mass of the main actuator 10 may be denoted as M2. This moving mass M2 comprises the mass of the piston of the main actuator 10 as well as that of the hydraulic fluid in the main actuator 10 and the mass of the main receiver plate 12, the mass of the dual-acting cylinders 20a including corresponding hydraulic fluid and the receiving plate 12a. Thus, it is evident that the moving mass M2 (second moving mass) is larger by a multiple than the first moving mass M1. With this advantageous configuration, it is possible to provide two actuator systems covering different frequency ranges, so that an excitation of the vehicle over a broad frequency range is possible.

A modification of the exemplary embodiment shown in FIG. 3a is shown in FIG. 3b. The additional actuator system Z here has only single-acting hydraulic cylinders 20b. As a result, the construction of the additional actuator system can be significantly simplified. In order to ensure the function, however, the spring elements 20c are provided, which enable a resetting of the pistons of the single-acting cylinders 20b. The spring elements 20c and the pistons of the single-acting cylinders 20b are preferably connected directly to the wheel contact plate (receiving plate 12a). The actuation of the single-acting cylinders 20b occurs in turn via the servo valve 14, which can also be simplified in this embodiment. The cylinders of the additional actuator system Z are furthermore designed preferably as plunger cylinders, so that a simple excitation is made possible.

In FIG. 3c, the receiving element A is designed as a flat belt support. The flat belt support comprises here a first roller R1 and a second roller R2, which stand in connection with each other via the belt 16. Preferably, at least one (or both) of the rollers R1 or R2 can be driven, so that the belt can be moved. The additional actuator system Z comprises the additional actuator 20, which is arranged substantially between the first roller R1 and the second roller R2. The additional actuator 20 comprises a piston, which acts on a belt support, which can be contacted with the belt 16. The additional actuator 20 in FIG. 3c is designed as a dual-acting cylinder.

An especially favorable modification is shown in FIG. 3d. In this optimized embodiment, the receiver element A is designed as a flat belt support and comprises the first roller R1 and the second roller R2, which stand in connection with each other via the belt 16. The additional actuator of the additional actuator system Z is provided as a single-acting cylinder 20b, wherein furthermore a spring element 20c is provided in order to ensure the resetting of the piston of the single-acting cylinder. The excitations to be applied by the additional actuator system Z can be applied here in the belt support, which can be contacted with the belt 16. For excitations in the low frequency range, the main actuator 10 is actuated, which moves the moving masses M1 and M2, and for the frequency range beyond the limit frequency the additional actuator system Z is actuated, which only has to move the moving mass M1.

Figure 4:
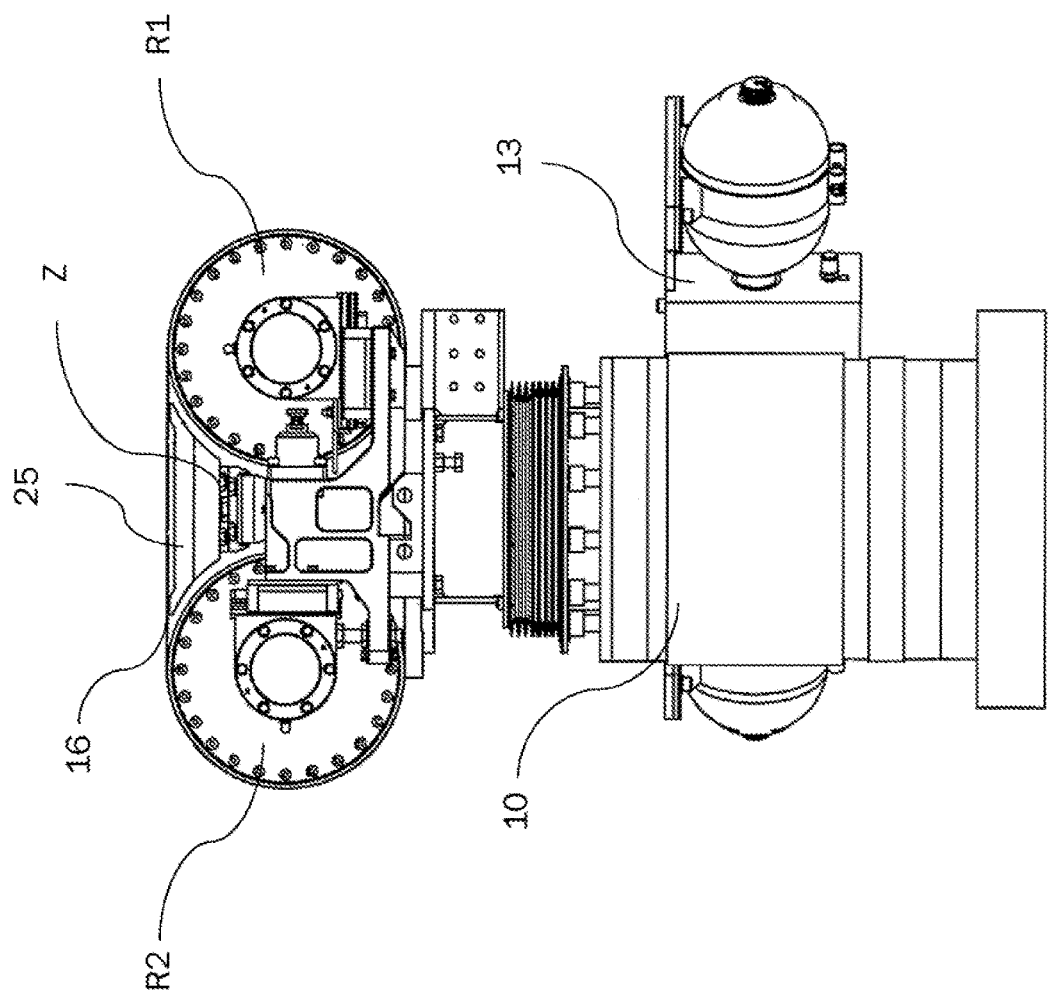
FIG. 4: shows a detail view of the excitation system with one flat belt support.

FIG. 4 shows a single shaker with wheel drive. Beneath the belt support 25 there is installed the additional actuator system Z. The belt 16 on which the vehicle wheel 15 rolls is led over the rollers R1 and R2 and tightened by a cylinder. The belt 16 is preferably a steel belt. The support for the steel belt is designed as a pneumatic bearing (fluid bearing) in order to minimize or prevent friction. This fluid bearing 25 connects the contact of the belt 16 with the contact bearing even under load. The flat belt support is fastened to the movable part of the main actuator 10.

Figure 5:
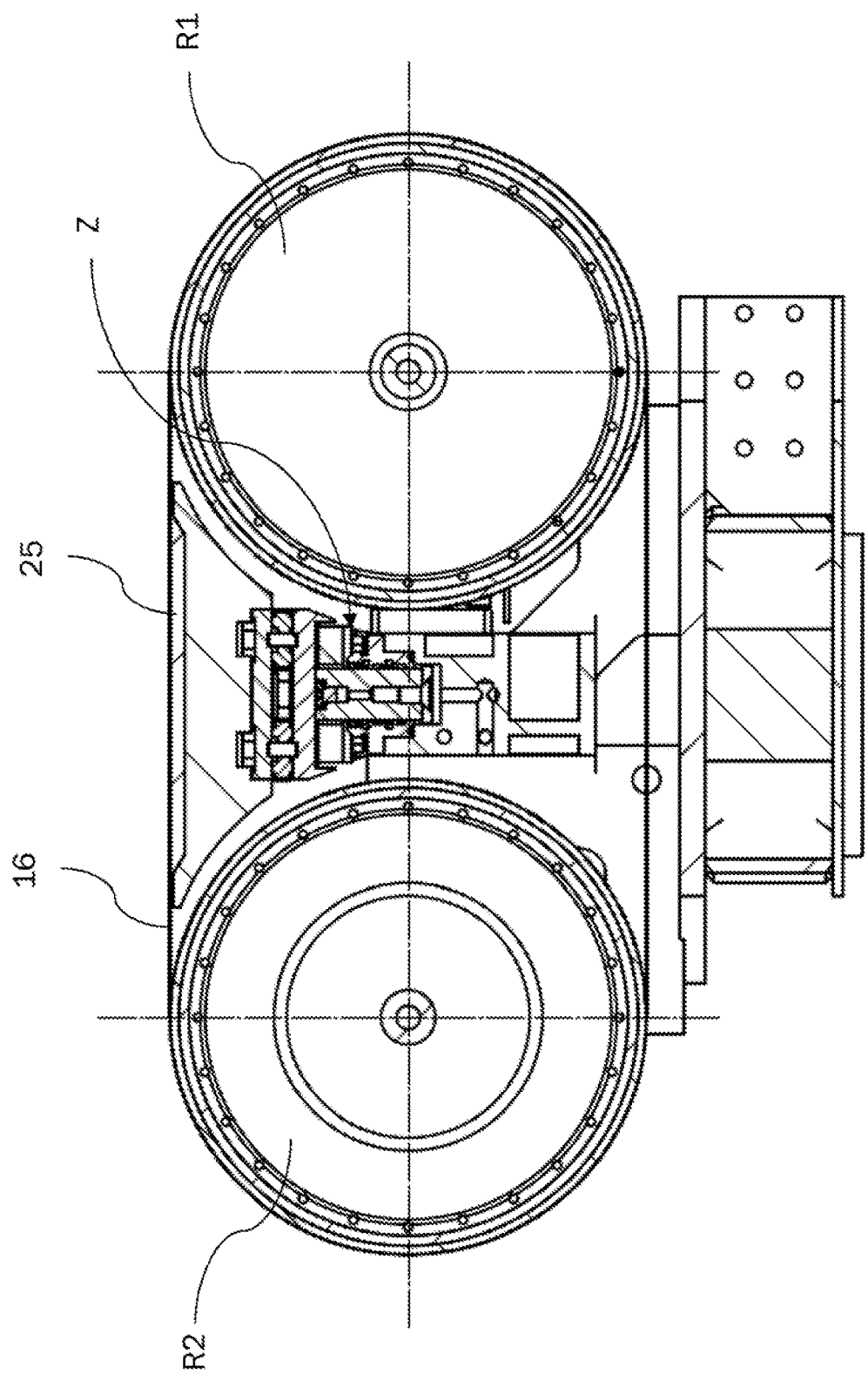
FIG. 5: shows the flat belt support and the additional actuator system.
Figure 6:
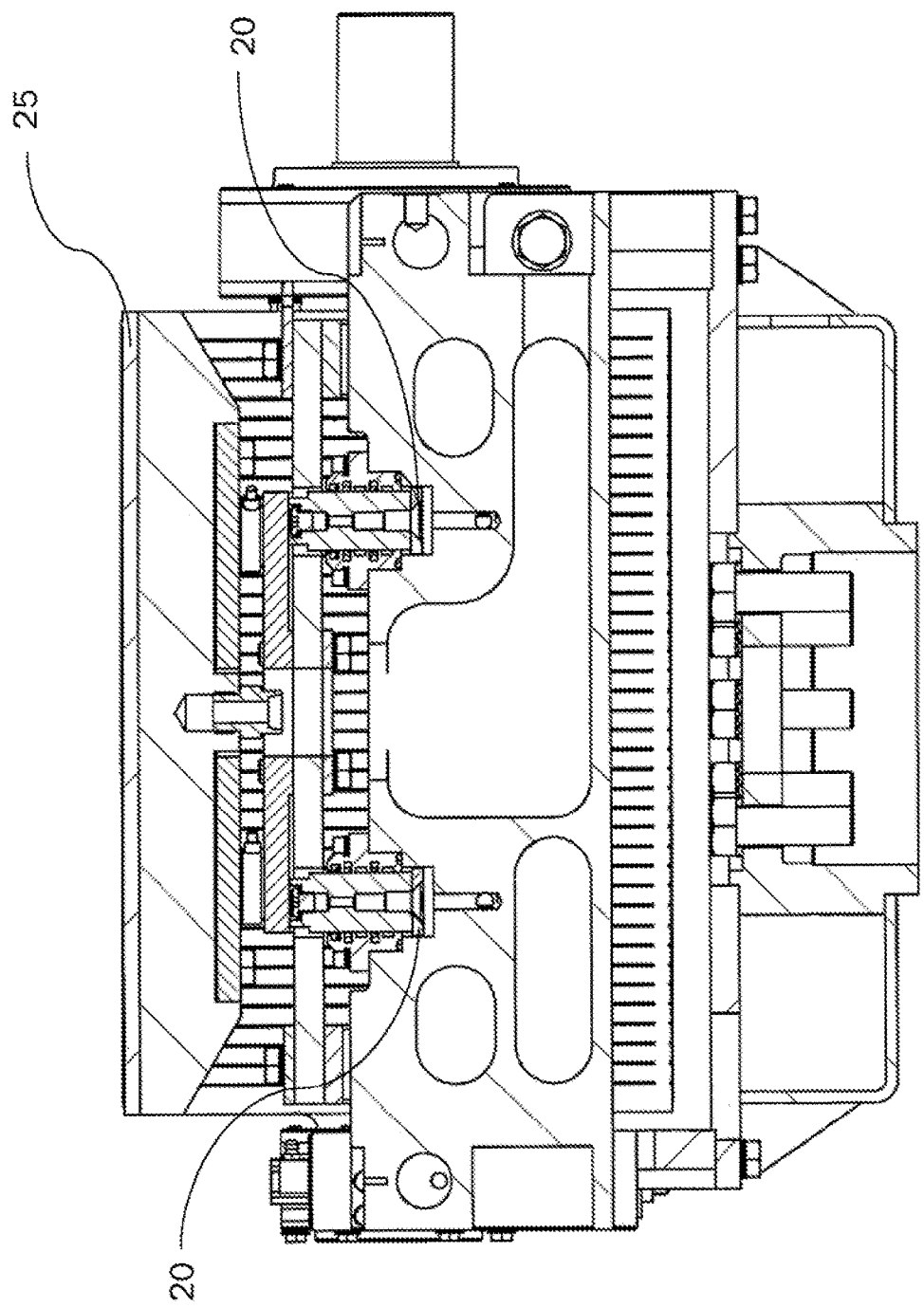
FIG. 6: shows a further view of the flat belt support with the additional actuator system.

FIGS. 5 and 6 show detail views of the wheel belt unit in cross section. As shown in FIG. 5, the first roller R1 is connected to the second roller R2 across the belt 16, the belt being supported in the region between the rollers by a contact bearing. This fluid bearing (belt support 25) has a surface along which the belt 16 can be moved. At the opposite side of the belt support 25 there is provided the additional actuator system Z by which the belt support 25 and the belt 16 can be excited.

FIG. 6 shows a side view, representing two additional actuators 20, which can excite the belt support 25 and the belt 16.

The present features, components, and specific details may be exchanged and/or combined to create further embodiments in dependence on the required purpose of use. Any modifications which lie within the knowledge of the person skilled in the art are implicitly disclosed by the present specification.

The invention claimed is:

1. A device for the testing of vehicles, the device comprising:
   a receiving element having a contact area for contacting with a vehicle; and an excitation system for applying excitation frequencies to the receiving element, the excitation system comprising:
a main actuator system including at least one movable main actuator that applies excitation frequencies in a first frequency range, and
an additional actuator system with at least one movable additional actuator coupled in series with a corresponding main actuator, wherein the movable additional actuator applies excitation frequencies in a second frequency range higher than the first frequency range.

2. The device of claim 1 wherein with the main actuator system excitation frequencies up to a first limit frequency are applied and excitation frequencies which are greater than the first limit frequency are applied via the additional actuator system.

3. The device of claim 1 wherein the additional actuator system is situated between the receiving element and the main actuator system.

4. The device of claim 1 wherein the eigenfrequency of the main actuator system is less than the eigenfrequency of the additional actuator system.

5. The device of claim 1 wherein the main actuator system has, as its main actuator, a first hydraulic cylinder with a movable end section, and the additional actuator system has, as its additional actuator, at least one second hydraulic cylinder, and wherein at least the one second hydraulic cylinder is fastened on the movable end section of the first hydraulic cylinder.

6. The device of claim 1 wherein the main actuator system comprises at least one dual-action cylinder and/or the additional actuator system comprises at least one dual-action cylinder.

7. The device of claim 1 wherein the main actuator system comprises a dual-action hydraulic cylinder and the additional actuator system comprises at least one single-action hydraulic cylinder and wherein a spring element is additionally provided in the additional actuator system.

8. The device of claim 1 wherein the additional actuator system comprises at least one plunger cylinder.

9. The device of claim 1 wherein the moving mass of the main actuator system is greater than the moving mass of the additional actuator system, and wherein the moving mass of the main actuator system contains the moving mass of the additional actuator system.

10. The device of claim 1 wherein the additional actuator system can be entrained by the movement of the main actuator.

11. The device of claim 1 wherein the device comprises four receiving elements and an excitation system is associated with each receiving element.

12. The device of claim 1 wherein the excitation system generates an excitation in the vertical direction.

13. The device of claim 1 wherein the additional actuator is mechanically coupled to the main actuator.

14. The device of claim 1 wherein the main actuator system may be used up to an excitation frequency of 50 Hz and the additional actuator system may be used for frequencies over 50 Hz.

15. The device of claim 1 wherein the main actuator system is actuated by at least one servo valve and wherein the at least one servo valve is arranged at the stationary part of the main actuator system.

16. The device of claim 1 wherein the receiving element is a wheel pan for the receiving of a wheel of the vehicle being tested.

17. The device of claim 1 wherein the additional actuator system is provided in the area of a movable end of the main actuator.

18. The device of claim 17 wherein a main receiving plate is provided at the movable end of the main actuator and the additional actuator is arranged on the main receiving plate.

19. The device of claim 1 wherein the receiving element comprises two rollers which are rotatably joined together by a belt to form a flat belt support.

20. The device of claim 19 wherein the additional actuator stands in connection with the belt in such a way that the latter can be excited by the additional actuator system and wherein the main actuator stands in connection with at least one roller of the flat belt support in such a way that the roller can be excited via the main actuator system.

21. The device of claim 19 wherein a belt support is provided for the contacting with the belt and the additional actuator system stands in connection with the belt support.

22. A vehicle test stand comprising:
a receiving element having a contact area for contacting with a vehicle; and
an excitation system for applying excitation frequencies to the receiving element, the excitation system comprising:
a main actuator system including at least one movable main actuator that applies excitation frequencies in a first frequency range, and
an additional actuator system with at least one movable additional actuator coupled in series with a corresponding main actuator, wherein the movable additional actuator applies excitation frequencies in a second frequency range higher than the first frequency range;
wherein four main actuator systems and four additional actuator systems are provided and wherein each main actuator system comprises a hydraulic ram on which an additional actuator system is provided, and wherein the main actuator systems and the additional actuator systems are designed to excite a vehicle positioned on the test stand in the vertical direction with at least one excitation frequency via the vehicle tires provided on the receiving elements.

23. A vehicle test stand comprising:
a receiving element having a contact area for contacting with a vehicle; and
an excitation system for applying excitation frequencies to the receiving element, the excitation system comprising:
a main actuator system including at least one movable main actuator that applies excitation frequencies in a first frequency range, and
an additional actuator system with at least one movable additional actuator coupled in series with a corresponding main actuator, wherein the movable additional actuator applies excitation frequencies in a second frequency range higher than the first frequency range;
wherein the vehicle test stand is a flat belt test stand.

* * * * *